UNITED STATES PATENT OFFICE.

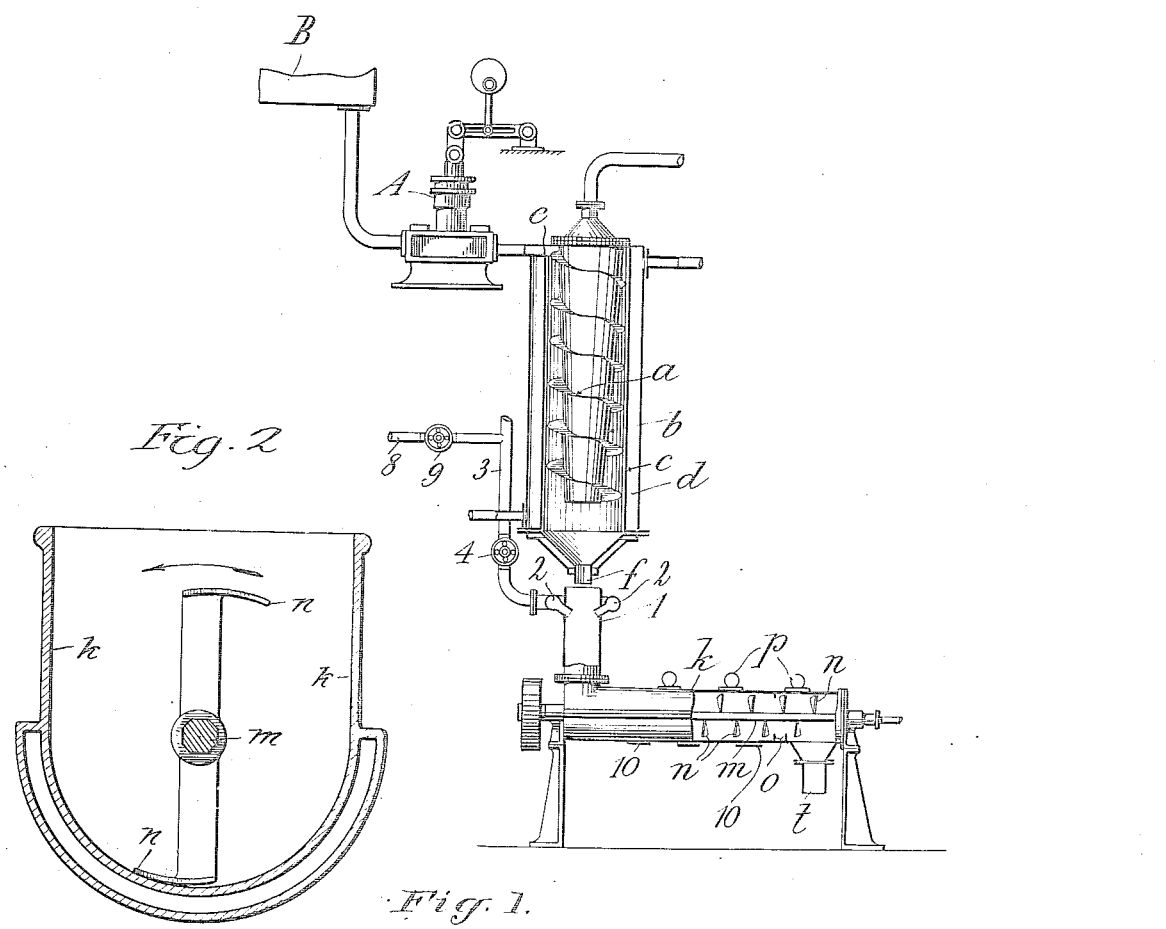

EDWARD SHAW, OF LONDON, AND GEORGE SAMUEL BAKER, OF MIDDLESEX, ENGLAND.

TREATMENT OR PREPARATION OF SUGAR.

1,309,425.   Specification of Letters Patent.   Patented July 8, 1919.

Application filed March 16, 1915. Serial No. 14,739.

*To all whom it may concern:*

Be it known that we, EDWARD SHAW and GEORGE SAMUEL BAKER, subjects of the King of Great Britain and Ireland, residing, respectively, at London and Middlesex, England, have invented Improvements in the Treatment or Preparation of Sugar, of which the following is a specification.

This invention has reference to the production of fine powdery sugar particularly sugar such as is made in the East and is known as "pelée".

There are two distinct methods of producing sugar for direct consumption. The first and so far as concerns sugars manufactured for general sale throughout the world, the most important method is characterized by growth of crystals, in a sugar solution, with a final separation of the mass into two products crystals or lump sugar on the one hand, and syrups or molasses on the other.

The second method is peculiar chiefly to Portugal and Brazil on the one hand and the East, that is China, Singapore, etc., on the other. This method consists broadly in concentrating a syrup, then of causing crystallization, and while doing so, to also cause nearly the whole of the water to evaporate leaving only one product which is mostly in the form of a dry, or nearly dry, pure crystallized sugar mixed with small amorphous lumps of sugar, which are not of the characteristic crystallization form.

The sugars made in this manner vary in purity from a very high to a low grade. The high grade sugars are produced in Portugal and Brazil as also are the low grade sugars, but in the East practically nothing but low grade sugars are made and they are known as pelée.

The present application deals with a modification of the process by means of which pelée sugar is produced.

Pelée is similar to the Portuguese sugar, "assucar areado" except that it contains some syrup and has a lower purity. According to the present invention pelée sugar is prepared by concentrating a syrup up to about 270° F. by a continuous form of evaporator, delivering the same into a chamber wherein crystallization is produced by rapid beating, together with a liquid cooling agent the whole being conveyed through the chamber while being subjected to a stirring and mixing action under such heat conditions that the sugar will leave the chamber in an apparently dry and evenly crystallized condition. The addition of a liquid cooling agent such as cool syrup, lowers the temperature of the highly concentrated sugar solution at the moment when it falls into the trough with the result that the sugar produced by stirring retains in addition to the crystals and amorphous lumps, a certain amount of syrup which owing to the surface tension properties of the liquid, collects itself inside groups of the otherwise dry sugar crystal and lumps.

This action produces an apparently dry but soft sugar which gives only slight evidence of stickiness and at the same time owing to the syrup form of part of the sugar, a sensation of great sweetness in the mouth. Such sugar is known as pelée.

In the production of such sugar the syrup used is heated to about 270° F., preferably by passing it through a steam heated spiral passage of gradually increasing area as described in prior British specification No. 27185 of 1913, and is then delivered into a crystallization chamber together with a cooling agent, the whole being conveyed through the chamber in suchwise that stirring and mixing is effected under such heat conditions that the sugar will leave the chamber in a substantially dry and evenly crystallized condition, the crystals or grains of sugar being fine but capable of being varied by altering the proportion and class of cooling agent employed, the temperature of the heated sugar and the heat and other conditions maintained in the crystallization chamber. For example a syrup of from 50 to 65° Brix heated as set forth to a temperature of 270° F. emerges at a density of from 80 to 98° Brix. If this heated and concentrated syrup is mixed with from 10 to 40% of cold syrup of from 50 to 65° Brix in density the mixture so produced is of a density above the crystallization point (66° Brix at a temperature of 60° F.) This mixture is allowed to fall on to the relatively cool surface of the crystallization chamber wherein it is agitated while being conveyed therethrough with the result that there is produced the particular form of crystallization desired and which characterizes the powdery sugar known as "pelée". The addition of the cold syrup hastens the process of crystallization, as the point at which crystallizing takes place differs according both to the temperature and to the density of the syrup. Thus, a syrup of 80° Brix will not crystallize if its temperature is anywhere near 270° F., but a syrup of 66° Brix will crystallize if its temperature is not over 60° F. The form which the crystals assume in the crystallization chamber depends also upon the density and temperature of the syrup, and upon the speed at which the agitating members or beaters revolve. It is found in practice that by dropping or raising the temperature of the hot syrup the size of grain or form of crystal of the finished sugar is altered.

The heat conditions by which the form of crystal or size of grain can be regulated may be controlled by regulating the temperature of the hot syrup; by admitting a current of hot or cold air into the crystallization chamber, and by varying the temperature of hot and cold water jackets provided on the crystallization chamber.

The added cooling agent may conveniently be some of the sugar syrup at a temperature of say 120° F. as the sugar contained in this syrup will be crystallized out together with that in the heated syrup, with resultant fuel economy.

The addition of a cooling agent to the hot sugar syrup, not only initiates the formation of fine crystals or grains in a very favorable manner, but enables the process to be regulated to produce the desired class of product by varying the proportion of temperature of the added agent.

Figure 1 of the accompanying drawing illustrates diagrammatically an apparatus which may be employed in carrying out the present invention but it is to be understood that this is illustrated by way of example only and may be variously modified. Fig. 2 shows to a larger scale a cross section through the crystallization chamber.

The sugar referred to as pelée is a class of sugar in which there is a quantity of water to the extent of 3% to 10% obscured in minute quantity between the particles of crystalline or amorphous sugar in such a manner that the surface tension of the water holds the particles of sugar together in groups, the outside of the grouped sugar being partially dry. This sugar is made in large quantities in the East Indies, and differs from the ordinary crystalline sugar, because it is formed by drying out the water, leaving the sugar, invert sugar and other impurities mixed with a small quantity of water in the final semi-dry product. The term "dry" and "substantially dry" in the specification and claims refers to the fact that in handling such sugar the nearly dry surface of the groups is in contact with the hand, and moreover such groups remain practically free from each other giving a dry or loose appearance to the mass generally.

The cool syrup is pumped from a tank B by a pump A, the stroke of which is adjustable, through a spiral passage of gradually increasing area formed by a spiral plate $a$ interposed between a vertical cone $b$ and a surrounding cylinder $c$ contained within a steam jacket $d$, the inlet $e$ to the spiral passage being at the top and the outlet $f$ at the bottom and the steam being allowed to escape from near the outlet through the internal cone $b$. Between the edge of the spiral plate $a$ and the heated wall $c$ a slight space is left for the purpose of allowing a portion of the syrup as it is whirled through a spiral passage to pass and thus prevent any portion of the heated wall $c$ becoming uncovered and causing the syrup to caramelize. The heated syrup passes from the heater into the pipe 1 leading to the crystallization chamber $k$. 2, 2 are nozzles leading into the pipe 1 from a cool syrup supply pipe 3 fitted with a regulating valve 4; the cool syrup may flow to the nozzles by gravity or may be forced to them by means of a pump. 8 is a water supply connection to the pipe 3 fitted with valve 9.

The crystallization chamber $k$, which may be in the form of an open or partially covered trough is fitted with a rotating longitudinal shaft $m$ provided with suitably arranged fingers or prongs $n$ which at some parts of the chamber for instance, near the delivery end, work between fixed pegs $o$ projecting upwardly from the bottom of the chamber so as to more effectively break up the mass and cause the escape of steam. The heat conditions may be further controlled by passing steam or hot air, or cold air or water through the shaft $m$ and its fingers or prongs $n$ and also through the fixed pegs $o$. The carrying away of the steam may be facilitated and the heat conditions still further regulated by drawing or forcing hot or cold air through the chamber which is provided with a series of inlets or outlets $p$ throughout its length so as to enable the conditions to be adjusted at any part of or throughout the chamber as may be required for the particular class of syrup being dealt with or the particular grade of sugar it is desired to produce.

As shown in Fig. 2, the fingers or prongs *n* are formed with their leading or front faces rearwardly curved toward their outer ends so that small lumps will be caught and crushed between the said faces and the wall of the chamber *k*.

To enable sugar which is in an unsatisfactory or imperfect condition to be readily removed from the chamber *k* without passing right through to the delivery outlet, a series of closured openings 10 may be provided in the bottom of the chamber so that by opening one or more of these the imperfectly treated material can be at once got rid of.

The sugar passes from the chamber *k* through the pipe *t* for bagging or supplementary treatment.

We have discovered that by the addition of a comparatively small quantity of syrup at the point where the hot syrup enters the trough or crystallizing chamber, we can utilize the heat of the 270° F. syrup to evaporate the necessary quantity of water contained in the cold syrup, while the cold syrup increases the out-put and causes the formation of pelée sugar, and at the same time accelerates crystallization, by the reduction of the temperature of the hot sugar and finally discharging the sugar from the trough of an entirely different commercial quality from that produced by our English Patent 28,296 of 1903.

We have found in practice that water up to 14% can be held by the sugar at the end of the process, and at this high percentage the sugar is lumpy and useful for certain purposes. Generally the class of sugar produced by the method herein defined contains 6% of water. It is, therefore, possible by our method to produce pelée sugar by introducing 40% cold syrup containing 25% of water, the quantities of sugar and water will then be as follows: 60 lbs. of dry sugar from the hot syrup; 30 lbs. of sugar from the cold syrup, and 10 lbs. of water added with the cold syrup. By adding the comparatively cold syrup, at say 200° F. which is 70° cooler than the hot syrup, we have discovered that the added cold syrup will not interfere with the drying and crystallization of the hot syrup, and that the final production will contain less than 10% of water, since the discharge of the whole mass at 130° F. gives a surplus of heat of about 1000 B. T. U. and reduces the final water to say 9%.

What we claim is:—

1. The preparation of sugar of the class known as pelée by concentrating a syrup up to about 270° F. by a continuous form of evaporator, delivering the same into a chamber wherein crystallization is produced by rapid beating, together with a liquid cooling agent the whole being conveyed through the chamber while being subjected to a stirring and mixing action under such heat conditions that the sugar will leave the chamber in an apparently dry and evenly crystallized condition.

2. The preparation of sugar of the class known as pelée by concentrating a syrup up to about 270° F. by a continuous form of evaporator, delivering the same into a chamber wherein crystallization is produced by rapid beating, together with a liquid cooling agent consisting of sugar syrup, the whole being conveyed through the chamber while being subjected to a stirring and mixing action under such heat conditions that the sugar will leave the chamber in an apparently dry and evenly crystallized condition.

3. The treatment or preparation of sugar of the class known as pelée according to which syrup of from 50 to 65° Brix is heated to about 270° F. by passing it through a steam heated spiral passage of gradually increasing area, the resulting heated and concentrated syrup being then mixed with from 10 to 50° of cold syrup of from 50 to 60 degrees Brix at a temperature of 60° F., the mixture being finally delivered to a crystallizing chamber through which it is conveyed while being agitated.

4. The method of manufacturing pelée sugar, consisting in heating the syrup to 270° F., delivering it into a crystallization chamber, adding to the heated syrup cold syrup in the crystallization chamber thus utilizing the temperature of the hot syrup to evaporate the water in the cold syrup, and the cold syrup to accelerate the crystallization of the mass.

5. The method of manufacturing pelée sugar; which consists in heating a major mass of syrup to approximately 270° F., feeding it thus heated into a crystallizing holder, and feeding a relatively minor amount of cold syrup into the hot syrup and mixing them in the crystalling holder, thus utilizing the heat of the hot syrup to vaporize the water in the cold syrup, and the cold syrup to cool and accelerate the crystallization of the hot syrup.

6. The method of manufacturing sugar, consisting in heating approximately 60% of the final mass to approximately 270° F., then feeding approximately 40% of cold syrup into the hot syrup within the crystallizing chamber, thus utilizing the heat of the hot syrup to vaporize the water in the cold syrup, and the cold syrup to accelerate crystallization of the hot syrup.

7. The method of manufacturing pelée sugar, consisting in heating a syrup to a crystallizing temperature, adding to the heated syrup cold syrup and then crystallizing the mass, whereby the temperature of the hot syrup is utilized to evaporate the water in the cold syrup, and the cold syrup serves to accelerate the crystallization of the mass.

Signed at 53/4 Chancery Lane London England by the said EDWARD SHAW the 16 February 1915 and by the said GEORGE SAMUEL BAKER this nineteenth day of February 1915.

EDWARD SHAW.
GEORGE SAMUEL BAKER.

Witnesses:
WALTER I. SKERTEN,
ARTHUR WOOSNAM.